United States Patent
Saitoh et al.

(10) Patent No.: US 10,585,622 B2
(45) Date of Patent: Mar. 10, 2020

(54) DATA WRITING DEVICE AND METHOD

(71) Applicant: TOYO CORPORATION, Tokyo (JP)

(72) Inventors: Yoshiyuki Saitoh, Tokyo (JP);
Chunshan Luo, Tokyo (JP)

(73) Assignee: TOYO Corporation, Tokyo (JP)

( * ) Notice: Subject to any disclaimer, the term of this patent is extended or adjusted under 35 U.S.C. 154(b) by 0 days.

(21) Appl. No.: 16/331,315

(22) PCT Filed: Dec. 4, 2017

(86) PCT No.: PCT/JP2017/043533
§ 371 (c)(1),
(2) Date: Mar. 7, 2019

(87) PCT Pub. No.: WO2019/111303
PCT Pub. Date: Jun. 13, 2019

(65) Prior Publication Data
US 2019/0369907 A1    Dec. 5, 2019

(51) Int. Cl.
*G06F 12/00*    (2006.01)
*G06F 3/06*    (2006.01)

(52) U.S. Cl.
CPC .......... *G06F 3/0656* (2013.01); *G06F 3/0653* (2013.01); *G06F 3/0683* (2013.01); *G06F 3/0607* (2013.01)

(58) Field of Classification Search
CPC .... G06F 3/0656; G06F 3/0683; G06F 3/0653; G06F 3/0607
USPC ........................................................ 711/154
See application file for complete search history.

(56) References Cited

U.S. PATENT DOCUMENTS

| 2006/0212873 | A1 | 9/2006 | Takahisa | |
| 2010/0174853 | A1* | 7/2010 | Lee | G06F 12/0246 |
| | | | | 711/103 |
| 2016/0085701 | A1* | 3/2016 | Mirza | G06F 13/28 |
| | | | | 710/308 |

(Continued)

FOREIGN PATENT DOCUMENTS

| JP | 64-41918 | 2/1989 |
| JP | 9-54658 | 2/1997 |

(Continued)

OTHER PUBLICATIONS

International Search Report (ISR) dated Feb. 6, 2018 in International (PCT) Application No. PCT/JP2017/043533.

(Continued)

*Primary Examiner* — Mardochee Chery
(74) *Attorney, Agent, or Firm* — Wenderoth, Lind & Ponack, L.L.P.

(57) ABSTRACT

A data writing device includes secondary storages, an interface circuit which obtains data, and a computer apparatus which writes the data obtained in one of the secondary storages. The computer apparatus includes writing processes corresponding to the secondary storages as an application, respectively; a monitoring process which detects quantities of data whose writing is finished in the secondary storages; and a data distribution process which selects a secondary storage as a target for next writing based on requested data quantities of the secondary storages and the finished data quantities thereof, and instructs a writing process corresponding to the secondary storage as a target for next writing to write.

7 Claims, 6 Drawing Sheets

(56) References Cited

U.S. PATENT DOCUMENTS

2017/0052738 A1* 2/2017 Shimmitsu ............ G06F 3/0647

FOREIGN PATENT DOCUMENTS

| JP | 2000-99446 | 4/2000 |
| JP | 2006-259812 | 9/2006 |
| JP | 2009-32144 | 2/2009 |

OTHER PUBLICATIONS

Written Opinion of the International Searching Authority dated Feb. 6, 2018 in International (PCT) Application No. PCT/JP2017/043533.

* cited by examiner

FIG. 3

|  | Requested data quantity (A) | Finished data quantity (B) | Quantity of data currently being processed (A-B) |
|---|---|---|---|
| Writing process 51a | 4 | 3 | 1 |
| Writing process 51b | 2 | 2 | 0 |
| Writing process 51c | 5 | 2 | 3 |

DATA WRITING DEVICE AND METHOD

TECHNICAL FIELD

The present disclosure relates to data writing devices and methods, and particularly relates to a data writing device and a method which write data in secondary storages.

BACKGROUND ART

A device which can capture all the packets flowing through the communication network over a long time is required in preparation for dealing with communication failures in communication networks such as the Ethernet (registered trademark). To satisfy this requirement, the data captured should be recorded in a secondary storage at high rate without being dropped.

Conventional data writing methods using parallel secondary storages have been proposed as a technique of writing data in secondary storages at high rate (for example, see Patent Literature (PTL) 1). According to PTL 1, secondary storages are disposed in parallel, and data is written in one of the secondary storages which is under the lowest load. By such a configuration, data input/output to and from the parallel secondary storages is increased without an imbalance in access load.

CITATION LIST

Patent Literature

[PTL 1] Japanese Unexamined Patent Application Publication No. 09-54658

SUMMARY OF INVENTION

Technical Problem

Unfortunately, the technique according to PTL 1 needs its unique hardware such as "an access load managing device," "a data position determining device," and "a data position managing device," and thus enormous time and cost for implementation.

Although the technique "can also be implemented with a general-purpose CPU or microprocessor" (Paragraph 0026 of the specification) according to the description of PTL 1, any specific method for implementation is not disclosed, and nothing guarantees data writing at extremely high rate over a long time. For example, the technique according to PTL 1 has difficulties in the case where all the packets flowing through a communication network at an extremely high rate of 100 Gbps are recorded in the secondary storages over a long time such as 10 minutes or more without the packets dropped.

In general, many of secondary storages have writing performance which varies in terms of time, and therefore cannot provide highly stable writing performance over a long time. FIG. 6 is a data diagram illustrating the test results of writing performance of a solid state drive (SSD). The abscissa represents time (seconds), and the ordinate represents writing performance (MB/s). In this test, the data captured at a constant rate was continuously written from a computer apparatus to the SSD in the state where the processing load in the computer apparatus was fixed, and the temporal change in writing performance (MB/s) was measured. Apparently from the test results, a phenomenon that the writing performance intermittently degrades is found in the writing in the secondary storage over a long time. Accordingly, the conventional technique has difficulties in writing of the data in the secondary storage at a high rate over a long time without the data dropped.

The present disclosure has been made in consideration of such circumstances. An object of the present disclosure is to provide a data writing device and a method which require no unique hardware, and can record all the packets flowing through a communication network at a high rate of 100 Gbps, for example, in a secondary storage over a long time without the packets dropped.

Solution to Problem

To achieve the object above, the data writing device according to one embodiment of the present disclosure is a data writing device which writes data in secondary storages, the data writing device including: the secondary storages; an interface circuit which obtains data; and a computer apparatus which writes the data obtained by the interface circuit in one of the secondary storages. The computer apparatus includes a memory which retains software; and a processor which executes the software. The software includes an operating system which is a multiprocessing operating system; and an application executed under management of the operating system. The application includes writing processes which are provided corresponding to the secondary storages, and request the operating system for writing of the data in the secondary storages corresponding to the writing processes, respectively; a monitoring process which detects quantities of data whose writing is finished in the secondary storages, among pieces of data whose writing requests from the writing processes corresponding to the secondary storages have been received; and a data distribution process which selects a secondary storage, which is a target for next writing, from the secondary storages based on requested data quantities of the secondary storages, which are quantities of data whose writing is requested of the operating system by the writing processes corresponding to the secondary storages, and finished data quantities of the secondary storages, which are quantities of data whose writing is finished and which are detected by the monitoring process, and instructs a writing process corresponding to the secondary storage, which is selected, to write the data obtained by the interface circuit in the secondary storage. The writing processes request the operating system for writing of the data in the secondary storages corresponding to the writing processes, respectively, according to an instruction from the data distribution process.

To achieve the object above, the data writing method according to one embodiment of the present disclosure is a data writing method of writing data obtained by an interface circuit in secondary storages by a computer apparatus, the data writing method including: requesting, by writing processes, an operating system for writing of the data in the secondary storages, respectively, the writing processes being provided corresponding to the secondary storages; detecting, a monitoring process, quantities of data whose writing is finished in the secondary storages, among pieces of data whose writing is requested from the writing processes corresponding to the secondary storages; and selecting a secondary storage, which is a target for next writing, from the secondary storages based on requested data quantities of the secondary storages, which are quantities of data whose writing is requested of the operating system by the writing processes corresponding to the secondary storages, and finished data quantities of the secondary storages, which are quantities of data whose writing is finished and which are detected by the monitoring process, and instructing a writing process corresponding to the secondary storage, which is selected, to write the data obtained by the interface circuit in the secondary storage, the selecting and the instructing being performed by a data distribution process. The writing processes request the operating system for writing of data in the secondary storages corresponding to the writing processes, respectively, according to an instruction from the data distribution process. The operating system is a multiprocessing operating system. The writing processes, the monitoring process, and the data distribution process are processes executed under management of the operating system. The operating system, the writing processes, the monitoring process, and the data distribution process are software executed by a processor included in the computer apparatus.

Advantageous Effects of Invention

The present disclosure can achieve a data writing device and method which require no unique hardware, and can record all the packets flowing through a communication network at a high rate, such as 100 Gbps, in a secondary storage over a long time without the packets dropped.

BRIEF DESCRIPTION OF DRAWINGS

FIG. 3 is a diagram of a data structure illustrating an example of calculation of the quantity of data currently processed in each of the writing processes in a data distribution process of the data writing device according to the embodiment.

DESCRIPTION OF EMBODIMENTS

Figure 1:
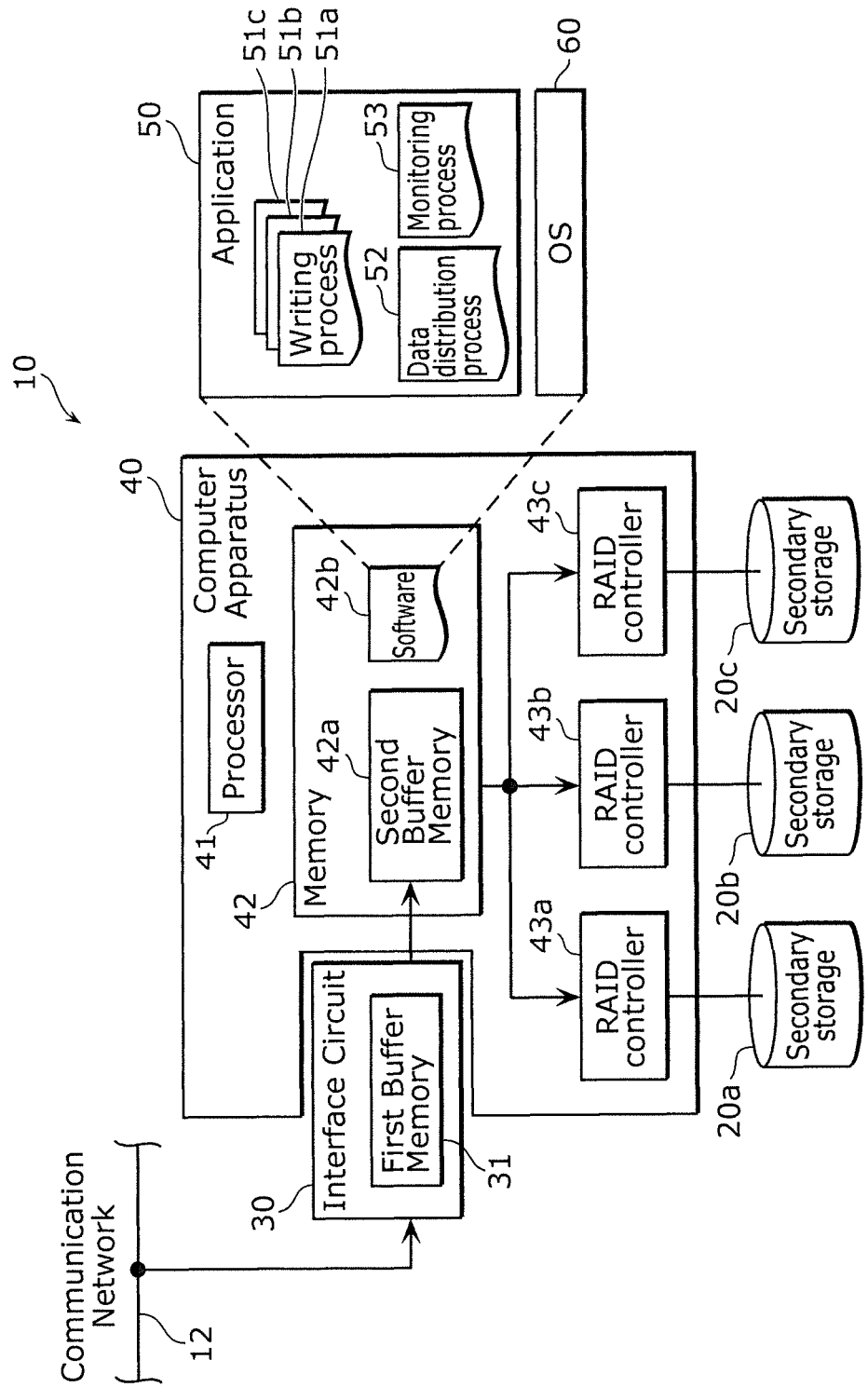
FIG. 1 is a block diagram illustrating a configuration of a data writing device according to an embodiment.

Embodiments according to the present disclosure will now be described in detail with reference to the drawings. The embodiment described below illustrates one specific example of the present disclosure. Numeric values, shapes, manufacturing companies, model numbers, components, arrangements, positions, and connection forms of the components, steps, and the order of the steps described in the embodiment below are exemplary, and are not intended to be limitative to the present disclosure. Moreover, among the components of the embodiment below, the components not described in an independent claim representing the most superordinate concept of the present disclosure will be described as arbitrary components. The drawings are not always strictly drawn. In the drawings, identical reference numerals will be given to substantially identical components, and the duplication of the description will be omitted or simplified.

FIG. 1 is a block diagram illustrating a configuration of a data writing device 10 according to an embodiment of the present disclosure.

The data writing device 10 writes data in secondary storages 20a to 20c. In the present embodiment, the device records all the packets flowing through a communication network, which includes the Ethernet (registered trademark) physical layer of 100 Gbps, in secondary storages 20a to 20c over a long time without the packets dropped. Although the data writing device 10 also has functions to read the written data from the secondary storages 20a to 20c and perform a variety of processings (such as display, extraction, and analysis) thereon, characteristic writing function thereof will be described.

As illustrated in FIG. 1, the data writing device 10 includes secondary storages 20a to 20c, an interface circuit 30 which obtains data (here, all the packets flowing through a communication network 12), and a computer apparatus 40 which writes the data obtained by the interface circuit 30 in one of the secondary storages 20a to 20c.

The secondary storages 20a to 20c each are a non-volatile storage which stores data, and are an SSD or a hard disk drive (HDD). For example, the secondary storages 20a to 20c are Redundant Arrays of Inexpensive Disks (RAID) each composed of eight SSDs (each volume is 400 GBytes) supporting the Serial Attached SCSI (SAS) standards.

The interface circuit 30 includes a first buffer memory 31 of a First-In-First-Out (FIFO) type which temporarily retains the obtained data, and transfers the data retained in the first buffer memory 31 to a memory 42 by Direct Memory Access (DMA) transfer. The interface circuit 30 is a network adaptor of 100 Gbps for the Ethernet (registered trademark), for example.

The computer apparatus 40 includes a memory 42 which retains software 42b, a processor 41 which executes software 42b, and RAID controllers 43a to 43c which control the data input/output to and from secondary storages 20a to 20c, respectively.

The memory 42 not only retains the software 42b loaded from an HDD (not illustrated) or the like in an executable format, and but also includes a second buffer memory 42a of a First-In-First-Out (FIFO) type, which is a data region which temporarily retains the data DMA transferred from the interface circuit 30. The memory 42 is composed of a Registered Dual Inline Memory Module (RDIMM), for example.

The processor 41 is composed of a CPU which executes the software 42b retained in the memory 42.

The RAID controllers 43a to 43c connect the secondary storages 20a to 20c to the computer apparatus 40, respectively, to control data input/output to and from the secondary storages 20a to 20c.

To ensure high-speed data transfer, the interface circuit 30, the processor 41, and the RAID controllers 43a to 43c are connected through a bus where the PCI Express 3.0 (Gen3) standards are supported, for example, in the present embodiment. The processor 41 is connected to the memory 42 by a data transfer method where the Double Data Rate 4 (DDR4) standards are supported. The RAID controllers 43a to 43c are connected to the secondary storages 20a to 20c, respectively, through a transfer bus where the SAS standards are supported.

The software 42b retained in the memory 42 includes a multiprocessing operating system (hereinafter, also referred to as "OS") 60, and an application 50, which is software executed under management of the OS 60.

The OS 60 is basic software for multiprocessing (i.e., multitasking) to operate the computer apparatus 40. Here, the OS 60 is kernel/software distinguished from the applications. For example, the OS 60 includes processes (device drivers) which perform data input/output to and from the secondary storages 20*a* to 20*c*. The OS 60 is Microsoft Windows (registered trademark) or Linux (registered trademark), for example.

The application 50 is software executed under the management of the OS 60, and includes writing processes 51*a* to 51*c* corresponding to the secondary storages 20*a* to 20*c*, respectively, a monitoring process 53, and a data distribution process 52.

The writing processes 51*a* to 51*c* are provided corresponding to the secondary storages 20*a* to 20*c*, respectively. The writing processes 51*a* to 51*c* request the OS 60 for the writing of data in the corresponding secondary storages 20*a* to 20*c*, respectively. Specifically, the writing processes 51*a* to 51*c* request the OS 60 for the writing of data in the corresponding secondary storages 20*a* to 20*c*, respectively, according to the instruction from the data distribution process 52. In other words, each of the writing processes 51*a* to 51*c* processes the instructed writing data independently from each other, achieving high-speed processing.

At this time, the writing processes 51*a* to 51*c* request the OS 60 to write the data in the corresponding secondary storages 20*a* to 20*c* without checking the free space of the secondary storages, respectively. If there is no free space, the data is written so as to be overwritten and saved, for example. When requesting the OS 60 for the writing of the data in the corresponding secondary storages 20*a* to 20*c*, the writing processes 51*a* to 51*c* update the requested data quantities, and notify the updated requested data quantities of the data distribution process 52, respectively.

Among the pieces of data whose writing requests from the writing processes 51*a* to 51*c* corresponding to the secondary storages 20*a* to 20*c* have been received, the monitoring process 53 detects the quantity of data whose writing is finished, in each of the secondary storages 20*a* to 20*c*. In other words, this process monitors the writing independently.

The data distribution process 52 selects a secondary storage as a target for next writing from the secondary storages 20*a* to 20*c* based on the requested data quantities of the secondary storages 20*a* to 20*c*, which are quantities of data whose writing is requested of the OS 60 by the writing processes 51*a* to 51*c* corresponding to the secondary storages 20*a* to 20*c*, and the finished data quantities of the secondary storages 20*a* to 20*c*, which are quantities of data whose writing is finished and which are detected by the monitoring process 53, and instructs the writing process corresponding to the selected secondary storage to write the data obtained by the interface circuit 30 in the selected secondary storage.

More specifically, the data distribution process 52 selects a secondary storage as a target for writing from the secondary storages 20*a* to 20*c*, the target secondary storage being a secondary storage corresponding to the writing process having the smallest value among the values obtained by subtracting the finished data quantities from the requested data quantities, respectively. Specifically, the data distribution process 52 subtracts the finished data quantities received from the monitoring process 53 from the requested data quantities after update received from the respective writing processes 51*a* to 51*c*, respectively, and defines the obtained values as the quantities of data currently being processed in the writing processes 51*a* to 51*c*. Among the obtained values, the data distribution process 52 considers the secondary storage corresponding to the writing process having the smallest quantity of data currently being processed as a secondary storage having the highest writing performance, and selects such a secondary storage from the secondary storages 20*a* to 20*c*. Such a configuration provides load balance between the secondary storages 20*a* to 20*c*, maintaining high writing performance over a long time. The term "considered as a secondary storage having the highest writing performance" indicates that it is determined that such a secondary storage is able to perform writing processing most immediately at that point of time.

In the case where two or more writing processes having the smallest quantity of data currently being processed (that is, there are two or more writing processes having the smallest quantity and the equal number of data currently being processed), the data distribution process 52 selects a secondary storage corresponding to one of the two or more writing processes as a target for writing. At this time, the data distribution process 52 may preferentially select a secondary storage corresponding to the writing process having a smaller finished data quantity.

The operation of the data writing device 10 according to the present embodiment having such a configuration will now be described.

Figure 2:
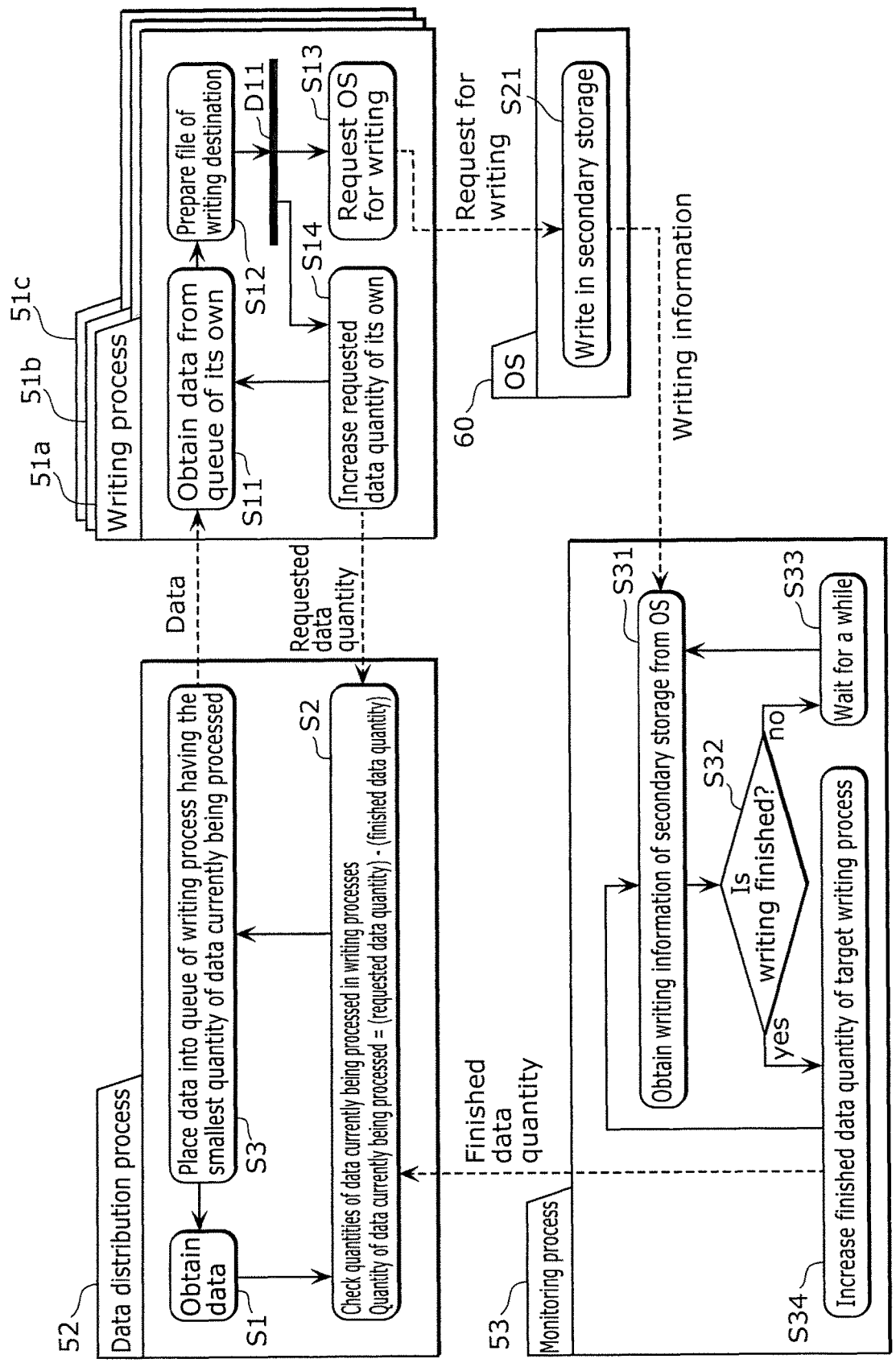
FIG. 2 is a diagram illustrating the processing contents of processes and communications between the processes in the data writing device according to the embodiment.

FIG. 2 is a diagram illustrating the processing contents of processes and communications between the processes (that is, a data writing method) in the data writing device 10 according to the present embodiment.

The data distribution process 52 obtains target data for writing (S1). In other words, the data distribution process 52 checks whether the target data to be written in the secondary storages 20*a* to 20*c* (here, a block which is a predetermined quantity of data) is present in the second buffer memory 42*a* of the memory 42 or not. The process goes to the next step S2 in the case where the data is present.

In the step S2, the data distribution process 52 calculates the quantity of data currently being processed in each of the writing processes 51*a* to 51*c* (S2). The quantity of data currently being processed is the value obtained by subtracting the finished data quantity (here, the number of blocks), which is the quantity of data whose writing in the secondary storage is finished, from the requested data quantity (here, the number of blocks), which is the quantity of data whose writing in the secondary storage is requested of the OS 60 by the writing process. The requested data quantity is obtained from each of the writing processes 51*a* to 51*c*. The finished data quantity is obtained from the monitoring process 53.

FIG. 3 is a diagram of a data structure illustrating one example of calculation of the quantity of data currently being processed in each of the writing processes 51*a* to 51*c* by the data distribution process 52.

The data distribution process 52 calculates the quantity of data currently being processed (unit: the number of blocks) in each of the writing processes 51*a* to 51*c* by subtracting the finished data quantity (unit: the number of blocks) obtained from the monitoring process 53 from the requested data quantity (unit: the number of blocks) obtained from each of the writing processes 51*a* to 51*c*. In the example illustrated in FIG. 3, the calculated quantities of data currently being processed (unit: the number of blocks) of the writing processes 51*a* to 51*c* are "1," "0," and "3," respectively.

The data distribution process 52 then selects a writing process having the smallest quantity of data currently being processed as the writing process corresponding to the secondary storage as a target for next writing. The data distribution process 52 instructs the writing of the data in the corresponding secondary storage by storing the address of the block present in the second buffer memory 42*a* in the queue of the selected writing process (S3). As illustrated in FIG. 3, the data distribution process 52 selects the writing process 51b having the smallest quantity of data currently being processed (here, "0"), and stores the writing target data, i.e., the address of the block present in the second buffer memory 42a in the second buffer memory 42a in the queue of the selected writing process 51b (namely, places the data into the queue). The data distribution process 52 thereby instructs the writing of the data in the secondary storage 20b corresponding to the selected writing process 51b.

After the processing in the step S3 is completed, the data distribution process 52 goes back to the step S1, and repeats the same processing.

When the address of the target block for writing is stored in the queue of each of the writing processes 51a to 51c (S11), each of the writing processes 51a to 51c prepares a file D11 corresponding to the secondary storage which is a writing destination (S12), and requests the OS 60 for writing of the block in the file D11 (S13). Here, the file D11 is a logical file indicating the corresponding secondary storage, such as a directory file in a file system managed by the OS 60. At this time, the writing processes 51a to 51c request the OS 60 for writing of the data without checking the free space in the secondary storages 20a to 20c corresponding to the writing processes 51a to 51c, respectively.

After requesting the OS 60 for the writing of the data in the corresponding secondary storages 20a to 20c, the writing processes 51a to 51c update (here, increment the requested data quantities by "1" indicating the number of blocks which have been written) the requested data quantities retained therein (or of their own), and notify the requested data quantities after update of the data distribution process 52, respectively (S14).

When the processing in the step S14 is completed, the writing processes 51a to 51c each return to the step S11, and repeat the same processing.

The OS 60, when receiving the request for writing, reads the block from the second buffer memory 42a, the block being indicated by the address stored in the queue of the writing process which has sent the request. The OS 60 then writes the block in the specified file D11 (i.e., the specified secondary storage) (S21).

The monitoring process 53 obtains writing information of the secondary storage from the OS 60 (S31) to determine whether the OS 60 has completed the writing in the secondary storage or not (S32). In the case where the monitoring process 53 determines that the OS 60 has not completed the writing (no in S32), the monitoring process 53 repeats the obtaining of the writing information (S31) and the determination (S32) after a wait for a while (S33).

When the monitoring process 53 determines that the writing in the secondary storage has completed (yes in S32), the monitoring process 53 updates the finished data quantity which corresponds to the writing process, which has finished the writing, and is retained in the secondary storage (here, increments the finished data quantity by "1" indicating the number of blocks which have been written), and notifies the finished data quantity after update of the data distribution process 52 (S34). Subsequently, the monitoring process 53 repeats the processing again from the step S31.

Figure 4:
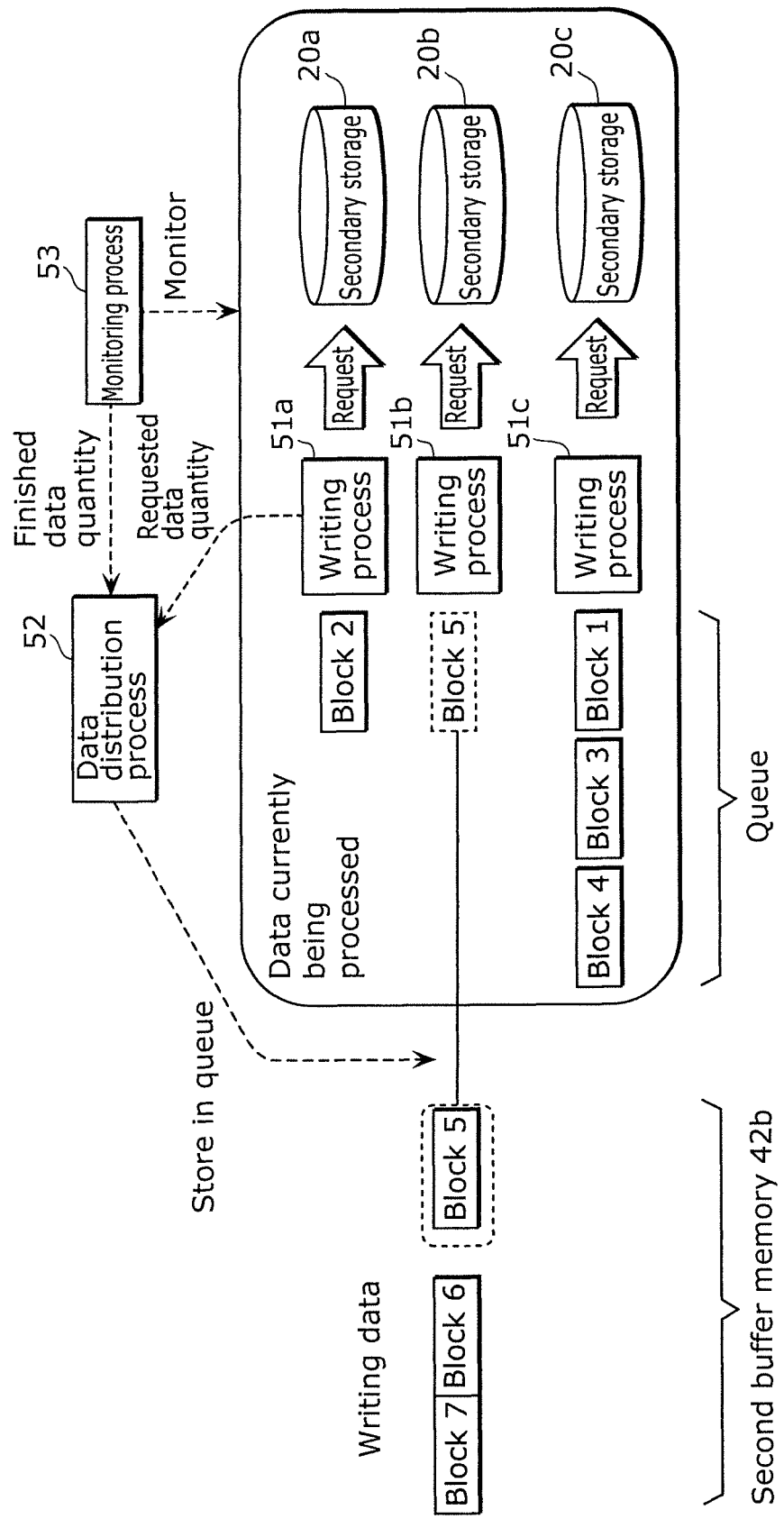
FIG. 4 is a conceptual diagram illustrating a flow of data in the data writing device according to the embodiment.

FIG. 4 is a conceptual diagram illustrating a flow of the data in the data writing device 10 according to the present embodiment.

Blocks 5 to 7 as data not written are currently stored in the second buffer memory 42a. Among these blocks, the oldest data or the block 5 is the writing target.

The quantities (unit: the number of blocks) of the data being processed in the writing processes 51a to 51c are "1,"

"0," and "3," respectively. Specifically, for the writing process 51a, the block 2 (more specifically, the address of the block 2 in the second buffer memory 42a) is stored in the queue of the writing process 51a, and the writing of the block 2 in the secondary storage 20a is being processed by the OS 60, which has received a request from the writing process 51a. For the writing process 51b, any other data is not stored in the queue of the writing process 51b, and the secondary storage 20b is in an idle state. For the writing process 51c, blocks 1, 3, and 4 (more specifically, the addresses of the blocks 1, 3, and 4 in the second buffer memory 42a) are stored in the queue of the writing process 51c, and the writing of the blocks 1, 3, and 4 in the secondary storage 20a is being processed by the OS 60 which has received a request from the writing process 51c.

In such a situation, when requesting the OS 60 for the writing of the data, each of the writing processes 51a to 51c notifies its latest requested data quantity (i.e., its total requested data quantity) of the data distribution process 52. The monitoring process 53 monitors the writing of the data in the secondary storages 20a to 20c by the OS 60, and thereby notifies the latest finished data quantity (i.e., the total finished data quantity) of each writing process of the data distribution process 52.

The data distribution process 52 then calculates the quantities of data currently being processed in the writing processes 51a to 51c by subtracting the finished data quantities obtained from the monitoring process 53 from the requested data quantities obtained from the writing processes 51a to 51c, respectively, and stores the block present in the second buffer memory 42a (more specifically, the address of the block in the second buffer memory 42a) in the queue of the writing process having the smallest quantity of data currently being processed. As the example illustrated in FIG. 4, the data distribution process 52 stores the block 5 of the second buffer memory 42a (more specifically, the address of the block 5 in the second buffer memory 42a) in the queue of the writing process 51b.

Thereby, the secondary storage corresponding to the writing process having the smallest quantity of data currently being processed is considered as a secondary storage having the highest writing performance, and the data is stored in the queue of the writing process 51b. The data is written in the secondary storage 20b by the OS 60, balancing the load.

EXAMPLES

An experiment of capturing packets flowing through the Ethernet (registered trademark) at 100 Gbps was performed using the data writing device 10 according to the present embodiment.

The experiment will now be described. In this experiment, two secondary storages were connected to a single RAID controller, and six secondary storages in total were used.

Figure 5:
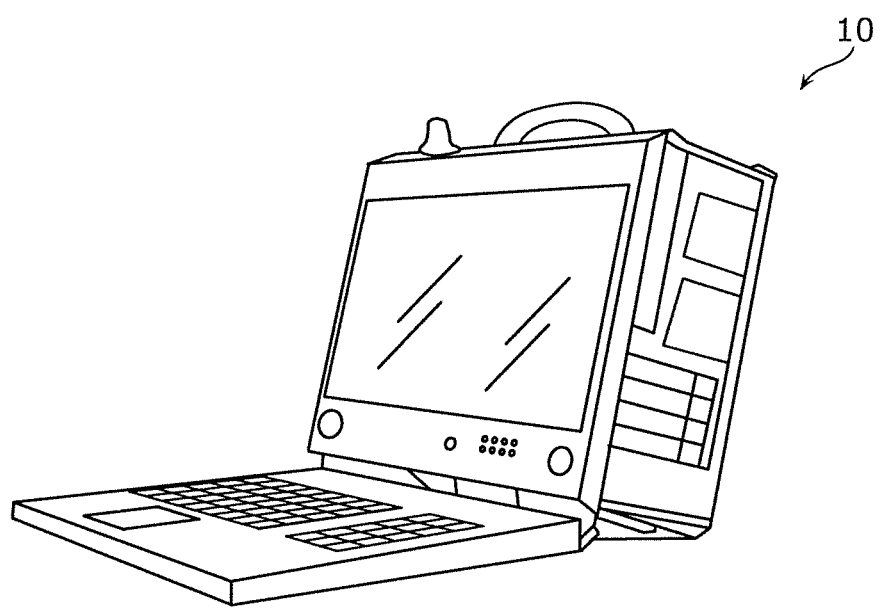
FIG. 5 is a diagram illustrating an appearance of the data writing device used in an experiment.
Figure 6:
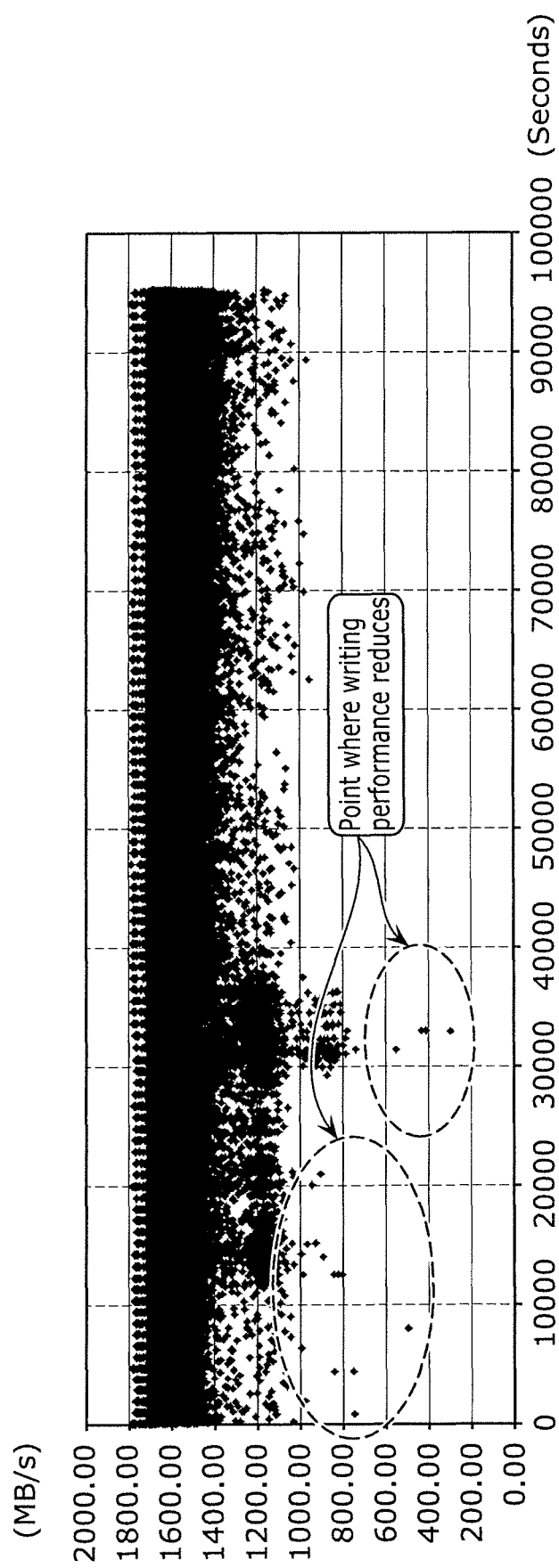
FIG. 6 is a data diagram illustrating the test results of the writing performance of an SSD.

As illustrated in the appearance diagram in FIG. 5, the data writing device 10 used in the experiment was configured as an integrated portable system including a user interface such as a keyboard and a display, and the main configuration of hardware is as described below.

Each of the secondary storages 20a to 20c is composed of four SAS-enabled SSDs each having a capacity of 800 GBytes. The processor 41 is composed of two processors (model Xeon E5-2637 v3 made by Intel Corporation). The memory 42 is composed of four RDIMMs having a capacity of 16 GBytes and being adaptable to 2133 MHz. RAID controllers 43a to 43c each are composed of an SAS-enabled RAID Card made by LSI Corporation. The interface circuit 30 is composed of a model ANIC-200K 100G (network adaptor for 100-Gbps Ethernet (registered trademark)) made by Accolade technology, Inc. The interface circuit 30, the processor 41, and the RAID controllers 43a to 43c are connected to each other through a bus supporting the PCI Express 3.0 (Gen3) standards. The processor 41 is connected to the memory 42 by a data transfer method supporting the DDR4 standards. The RAID controllers 43a to 43c are connected to the secondary storages 20a to 20c, respectively, through a transfer bus supporting the SAS standards.

The OS 60 is Linux (registered trademark) (Ubuntu 16.04.01). An application 50 is composed of the writing processes 51a to 51c, data distribution process 52, and the monitoring process 53, which have the functions described in the embodiment above.

A test to continuously capture packets flowing through the 100-Gbps Ethernet (registered trademark) was performed using the data writing device 10 having such a configuration. The results show that 48-hour continuous capture was realized with a drop rate of 0%.

As described above, the data writing device 10 according to the present embodiment is a device which writes data in secondary storages 20a to 20c. The device includes the secondary storages 20a to 20c, the interface circuit 30 which obtains data, and the computer apparatus 40 which writes the data obtained by the interface circuit 30 in one of the secondary storages 20a to 20c. The computer apparatus 40 includes the memory 42 which retains software 42b, and the processor 41 which executes software 42b. The software 42b includes the multiprocessing operating system 60, and the application 50 executed under the management of the operating system 60. The application 50 includes the writing processes 51a to 51c which are writing processes provided corresponding to the secondary storages 20a to 20c and request the operating system 60 for the writing of the data in the secondary storages 20a to 20c corresponding to the writing processes 51a to 51c, respectively. The application 50 also includes the monitoring process 53 which detects the quantities of the data whose writing is finished in the secondary storages 20a to 20c among pieces of the data whose writing requests from the writing processes 51a to 51c corresponding to the secondary storages 20a to 20c have been received. The application 50 also includes the data distribution process 52 which selects a secondary storage as a target for next writing from the secondary storages 20a to 20c based on the requested data quantities of the secondary storages 20a to 20c, which are quantities of data whose writing is requested of the operating system 60 by the writing processes corresponding to the secondary storages 20a to 20c, and the finished data quantities of the secondary storages 20a to 20c, which are quantities of data whose writing is finished and which are detected by the monitoring process 53. The data distribution process 52 instructs the writing process corresponding to the selected secondary storage to write the data obtained by the interface circuit 30 in the selected secondary storage. According to the instruction from the data distribution process 52, the writing processes 51a to 51c request the operating system 60 for the writing of the data in the secondary storages 20a to 20c corresponding to the writing processes 51a to 51c, respectively.

Thereby, the general-purpose computer apparatus 40 implements the writing of the data in the secondary storages 20a to 20c by the application 50 executed under the management of the multiprocessing operating system 60. Thus, the data writing device 10 is constructed without any unique hardware.

Moreover, the data distribution process 52 is provided as a process executed in parallel. The data distribution process 52 selects the secondary storage as a target for next writing based on the writing processes 51a to 51c corresponding to the secondary storages 20a to 20c, the monitoring process 53 which detects the data quantities of the secondary storages 20a to 20c where the data writing is finished, and the requested data quantities and finished data quantities in the secondary storages 20a to 20c. By such parallel functional distribution, the secondary storage considered to have the highest writing performance is selected as the secondary storage as a target for next writing based on the requested data quantities and the finished data quantities of the secondary storages, and data writing is performed, resulting in the load balance. As a result, stable and high writing performance is achieved as a whole, enabling the recording of all the packets flowing through an extremely high-speed (such as 100 Gbps) communication network in the secondary storages over a long time without the packets dropped.

Here, the data distribution process 52 selects the secondary storage as the target for writing from the secondary storages 20a to 20c, the secondary storage as the target for writing being a secondary storage corresponding to the writing process having the smallest value among the values obtained by subtracting the finished data quantities from the requested data quantities, respectively.

Thereby, the data distribution process 52 can calculate the quantity of data currently being processed in each of the secondary storages 20a to 20c by a simple arithmetic operation using the requested data quantity and the finished data quantity to evaluate the writing performance. Accordingly, the secondary storage considered to have the highest writing performance is selected as the secondary storage as a target for next writing, thereby enabling the high-speed writing of the data in the secondary storages over a long time without the data dropped.

The interface circuit 30 includes the first buffer memory 31 which temporarily retains the obtained data, and transfers the data retained in the first buffer memory 31 to the memory 42. The memory 42 includes the second buffer memory 42a which temporarily retains the data transferred from the interface circuit 30. The writing processes 51a to 51c request the operating system 60 for the writing of the data retained in the second buffer memory 42a in the secondary storages 20a to 20c corresponding to the writing processes 51a to 51c, respectively.

Thereby, the data obtained by the interface circuit 30 is transferred to the secondary storages 20a to 20c through the first buffer memory 31 included in the interface circuit 30 and the second buffer memory 42a included in the memory 42. As a result, the differences in the processing rate and the transfer rate between the data transfer components are absorbed, and the data obtained by the interface circuit 30 is written in the secondary storages at high rate over a long time without being dropped.

The writing processes 51a to 51c request the operating system 60 for the writing of the data in the secondary storages 20a to 20c corresponding to the writing processes 51a to 51c, respectively, without checking the free space.

This operation eliminates the overhead in the secondary storages 20a to 20c, which is accompanied by the check of the free space, and the data is written in the secondary storage at high rate over a long time without being dropped.

When requesting the operating system 60 for the writing of the data in the secondary storages 20a to 20c, the corresponding writing processes 51a to 51c update the requested data quantities, respectively. The data distribution process 52 selects the secondary storage corresponding to a writing process from the secondary storages 20a to 20c based on the requested data quantities of the writing processes 51a to 51c after the update, the writing process having the smallest value among the values obtained by subtracting the finished data quantities received from the monitoring process 53 from the requested data quantities, respectively.

Thereby, the data distribution process 52 can select the secondary storage as a target for next writing based on the requested data quantities updated in the writing processes 51a to 51c and the finished data quantities received from the monitoring process 53. As a result, the data distribution process 52 can appropriately select the secondary storage having the smallest quantity of data currently being processed, in other words, having the highest writing performance based on the information obtained from the writing processes 51a to 51c executed in parallel and the monitoring process 53.

Moreover, the data writing method according to the present embodiment is a data writing method of writing the data obtained by the interface circuit 30 in the secondary storages 20a to 20c by the computer apparatus 40. The method includes a step (S13) of the writing processes 51a to 51c provided corresponding to the secondary storages 20a to 20c requesting the operating system 60 for writing of data in the corresponding secondary storages 20a to 20c; a step (S31 to S34) of the monitoring process 53 detecting the quantity of the data whose writing is finished in each of the secondary storages 20a to 20c among pieces of the data whose writing requests from the writing processes 51a to 51c corresponding to the secondary storages 20a to 20c have been received; and steps (S1 to S3) of the data distribution process 52 selecting a secondary storage as a target for next writing from the secondary storages 20a to 20c based on the requested data quantities, which are quantities of data whose writing is requested of the operating system 60 by the writing processes 51a to 51c corresponding to the secondary storages 20a to 20c, respectively, and the finished data quantities, which are quantities of data whose writing is finished in the secondary storages 20a to 20c, respectively, and which are detected by monitoring process 53, and instructing the writing process corresponding to the selected secondary storage to write the data obtained by the interface circuit 30 in the selected secondary storage. According to the instruction from the data distribution process 52, the writing processes 51a to 51c request the operating system 60 for the writing of the data in the secondary storages 20a to 20c corresponding to the writing processes 51a to 51c, respectively (S11 to S13).

Thereby, the writing of the data in the secondary storages 20a to 20c is realized by the application 50 executed under the management of the multiprocessing operating system 60 in the general-purpose computer apparatus 40, and any unique hardware is unnecessary.

Moreover, the processes executed in parallel are provided, i.e., the writing processes 51a to 51c corresponding to the secondary storages 20a to 20c, the monitoring process 53 which detects the respective quantities of data whose writing is finished in the secondary storages 20a to 20c, and the data distribution process 52 which selects the secondary storage as a target for next writing based on the respective requested data quantities and finished data quantities of the secondary storages 20a to 20c. By such parallel functional distribution, the secondary storage considered to have the highest writing performance is selected as the secondary storage as a target for next writing based on the requested data quantities and the finished data quantities of the secondary storages, and data writing is performed, resulting in the load balance. As a result, stable and high writing performance is achieved as a whole, enabling the recording of all the packets flowing through an extremely high-speed (such as 100 Gbps) communication network in the secondary storages over a long time without the packets dropped.

The present disclosure may be implemented not only as the data writing device and the data writing method, but also as a non-transitory computer-readable recording medium having a program recorded thereon for causing a computer to execute the steps included in the data writing method. The program may be stored in a computer-readable recording medium such as a DVD and be distributed, or may be distributed through a communication network such as the Internet.

As above, the data writing device and the data writing method according to the present disclosure have been described based on the embodiment, but this embodiment is not limitative to the present disclosure. A variety of modifications of the present embodiment conceived and made by persons skilled in the art without departing the gist of the present disclosure, and embodiments including partial combinations of the components included in the present embodiment are also included in the scope of the present disclosure.

For example, although as the secondary storage as a target for writing, the data distribution process 52 selects the secondary storage corresponding to the writing process having the smallest value among the values obtained by subtracting the finished data quantities from the requested data quantities, respectively, in the embodiment above, any other method can be used. As the secondary storage as a target for writing, the data distribution process 52 may select the secondary storage corresponding to the writing process having the smallest value among the values obtained by dividing the finished data quantities by the requested data quantities. Thereby, the secondary storage as a target for writing is selected based on the proportion of the finished data quantity in the requested data quantity, and degradation of the writing performance can be efficiently avoided according to the type of secondary storages in some cases.

Although the requested data quantities after update are notified of data distribution process 52 by the writing processes 51a to 51c and the finished data quantities after update are notified of the data distribution process 52 by the monitoring process 53 in the embodiment above, such a communication between processes is not always essential. For example, a data table illustrated in FIG. 3 may be provided in a global memory region within the memory 42 accessible to the processes. The writing processes 51a to 51c may write the requested data quantities in the data table, the monitoring process 53 may write the finished data quantities in the data table, and the data distribution process 52 may refer to the data table to calculate the quantities of data currently being processed in the writing processes 51a to 51c.

Moreover, the update of the requested data quantity may be performed by the data distribution process 52 which receives the finish notifications of the writing requests from the writing processes 51a to 51c, which have requested the OS 60 for the writing, rather than by each of the writing processes 51a to 51c. Similarly, the update of the finished data quantity may be performed by the data distribution process 52, which receives the finish notification of the writing from the monitoring process 53, rather than by the monitoring process 53.

Although the packets in the 100-Gbps Ethernet (registered trademark) were captured in the embodiment above and Experimental Example, the data writing device according to the present disclosure can be used to obtain data from any other target than the 100-Gbps Ethernet (registered trademark). The ability to capture the packets in the 100-Gbps Ethernet (registered trademark) is only one example of the ability of the data writing device according to the present disclosure. In other words, the data writing device according to the present disclosure may be a device which captures data at a transmission rate higher or lower than 100 Gbps, or may be a device which obtains data from a transmission path different from the communication network or a device (such as a wiring pattern or a signal generator).

Although the data writing device configured as a portable system has been illustrated in Experimental Example above, the data writing device according to the present disclosure may have any other configuration and be configured as a rack-mount system.

Although each of the secondary storages 20a to 20c is composed of a RAID which treats multiple SSDs or HDDs as a single memory apparatus in the embodiment above, each of the secondary storages 20a to 20c may be composed of a single SSD or HDD.

Although the secondary storage as a target for next writing has been selected in a unit of one block and the writing processing has been performed in the embodiment above, the selection of the secondary storage and the writing therein may be performed in any other unit. The selection of the secondary storage and the writing therein may be performed in a unit of several blocks or a unit of data having a variable size. For example, in the case where the frequency of generation of the data to be written is varied, the selection of the secondary storage and the writing therein may be performed in a unit of data having a variable data quantity generated per a predetermined time. Thereby, the writing in the secondary storage may be performed at a constant frequency.

INDUSTRIAL APPLICABILITY

The present disclosure can be used as a data writing device which writes data in secondary storages, particularly as a device which records the obtained data in the secondary storage at high rate over a long time without the data dropped, such as a device which captures packets in the 100-Gbps Ethernet (registered trademark) over a long time without the packets dropped.

REFERENCE SIGNS LIST 10 data writing device
12 communication network
20a, 20b, 20c secondary storage
30 interface circuit
31 first buffer memory
40 computer apparatus
41 processor
42 memory
42a second buffer memory
42b software
43a, 43b, 43c RAID controller
50 application
51a, 51b, 51c writing process
52 data distribution process
53 monitoring process
60 operating system (OS)

The invention claimed is:

1. A data writing device which writes data in secondary storages, the data writing device comprising:
   the secondary storages;
   an interface circuit which obtains data; and
   a computer apparatus which writes the data obtained by the interface circuit in one of the secondary storages,
   wherein the computer apparatus includes:
      a memory which retains software; and
      a processor which executes the software,
   the software includes:
      an operating system which is a multiprocessing operating system; and
      an application executed under management of the operating system,
   the application includes:
      writing processes which are provided corresponding to the secondary storages, and request the operating system for writing of the data in the secondary storages corresponding to the writing processes, respectively;
      a monitoring process which detects quantities of data whose writing is finished in the secondary storages, among pieces of data whose writing requests from the writing processes corresponding to the secondary storages have been received; and
      a data distribution process which selects a secondary storage, which is a target for next writing, from the secondary storages based on requested data quantities of the secondary storages, which are quantities of data whose writing is requested of the operating system by the writing processes corresponding to the secondary storages, and finished data quantities of the secondary storages, which are quantities of data whose writing is finished and which are detected by the monitoring process, and instructs a writing process corresponding to the secondary storage, which is selected, to write the data obtained by the interface circuit in the secondary storage, and
   the writing processes request the operating system for writing of the data in the secondary storages corresponding to the writing processes, respectively, according to an instruction from the data distribution process.

2. The data writing device according to claim 1,
   wherein as the secondary storage, which is a target for writing, the data distribution process selects a secondary storage from the secondary storages, the secondary storage corresponding to a writing process having a smallest value among values obtained by subtracting the finished data quantities from the requested data quantities, respectively.

3. The data writing device according to claim 1,
   wherein the interface circuit includes a first buffer memory which temporarily retains the data obtained, and transfers the data retained in the first buffer memory to the memory,
   the memory includes a second buffer memory which temporarily retains the data transferred from the interface circuit, and
   the writing processes request the operating system for writing of the data, which is retained in the second buffer memory, in the secondary storages corresponding to the writing processes, respectively.

4. The data writing device according to claim 1,
   wherein the writing processes request the operating system for writing of the data in the secondary storages corresponding to the writing processes, respectively, without checking a free space.

5. The data writing device according to claim 2, wherein in the case where the writing processes request the operating system for writing of the data in the secondary storages corresponding to the writing processes, the writing processes update the requested data quantities, respectively, and the data distribution process selects a secondary storage from the secondary storages, the secondary storage corresponding to a writing process having a smallest value among values obtained by subtracting the finished data quantities received from the monitoring process from the requested data quantities after update received from the writing processes, respectively.

6. A data writing method of writing data obtained by an interface circuit in secondary storages by a computer apparatus, the data writing method comprising:

requesting, by writing processes, an operating system for writing of the data in the secondary storages, respectively, the writing processes being provided corresponding to the secondary storages;

detecting, by a monitoring process, quantities of data whose writing is finished in the secondary storages, among pieces of data whose writing is requested from the writing processes corresponding to the secondary storages; and selecting a secondary storage, which is a target for next writing, from the secondary storages based on requested data quantities of the secondary storages, which are quantities of data whose writing is requested of the operating system by the writing processes corresponding to the secondary storages, and finished data quantities of the secondary storages, which are quantities of data whose writing is finished and which are detected by the monitoring process, and instructing a writing process corresponding to the secondary storage, which is selected, to write the data obtained by the interface circuit in the secondary storage, the selecting and the instructing being performed by a data distribution process, and wherein the writing processes request the operating system for writing of data in the secondary storages corresponding to the writing processes, respectively, according to an instruction from the data distribution process, the operating system is a multiprocessing operating system, the writing processes, the monitoring process, and the data distribution process are processes executed under management of the operating system, and the operating system, the writing processes, the monitoring process, and the data distribution process are software executed by a processor included in the computer apparatus.

7. A non-transitory computer-readable recording medium having a program recorded thereon for causing a computer to execute steps included in the data writing method according to claim 6.

* * * * *